United States Patent [19]

Ohmi

[11] 4,043,251

[45] Aug. 23, 1977

[54] SERVOMOTOR

[75] Inventor: Atushi Ohmi, Anjo, Japan

[73] Assignee: Aisin Seiki Kabushiki Kaisha, Kariya, Japan

[21] Appl. No.: 666,424

[22] Filed: Mar. 12, 1976

[30] Foreign Application Priority Data

Mar. 14, 1975 Japan .............................. 50-35299[U]

[51] Int. Cl.² ......................... F15B 9/10; F01B 19/00; F16J 3/02
[52] U.S. Cl. ............................... 91/376 R; 91/369 B; 92/98 D; 92/99
[58] Field of Search ............. 91/376 R, 369 A, 369 B, 91/369 R; 92/98 R, 98 D, 99

[56] References Cited

U.S. PATENT DOCUMENTS

| 3,177,777 | 4/1965 | Kenrick | 91/369 A |
| 3,548,595 | 12/1970 | Pech et al. | 91/369 A |
| 3,688,647 | 9/1972 | Kytta | 91/376 R |
| 3,754,450 | 8/1973 | Putt et al. | 91/376 R |

*Primary Examiner*—Paul E. Maslouski

*Attorney, Agent, or Firm*—Finnegan, Henderson, Farabow & Garrett

[57] ABSTRACT

Improvements in a servomotor including a retainer coupling an annular diaphragm having its outer periphery sealingly attached to the servomotor housing and an axially movable power piston within the housing. The piston has a boss axially extending through the annular diaphragm and an external flange extending radially from the outer periphery of the boss for positioning adjacent the diaphragm, the diaphragm and power piston forming two pressure chambers. A valve member is slidably and sealingly disposed in a bore formed in the boss of the power piston for regulating pressure in the pressure chambers. The retainer has an axially extending cylindrical seat in which the boss is tightly positioned and a flange radially extending from the seat for pressing an inner portion of the diaphragm against the power piston flange. A pin is retained in radially aligned openings in the power piston boss and the cylindrical seat of the retainer and a groove in the outer periphery of the valve member for coupling the diaphragm against the power piston flange.

5 Claims, 4 Drawing Figures

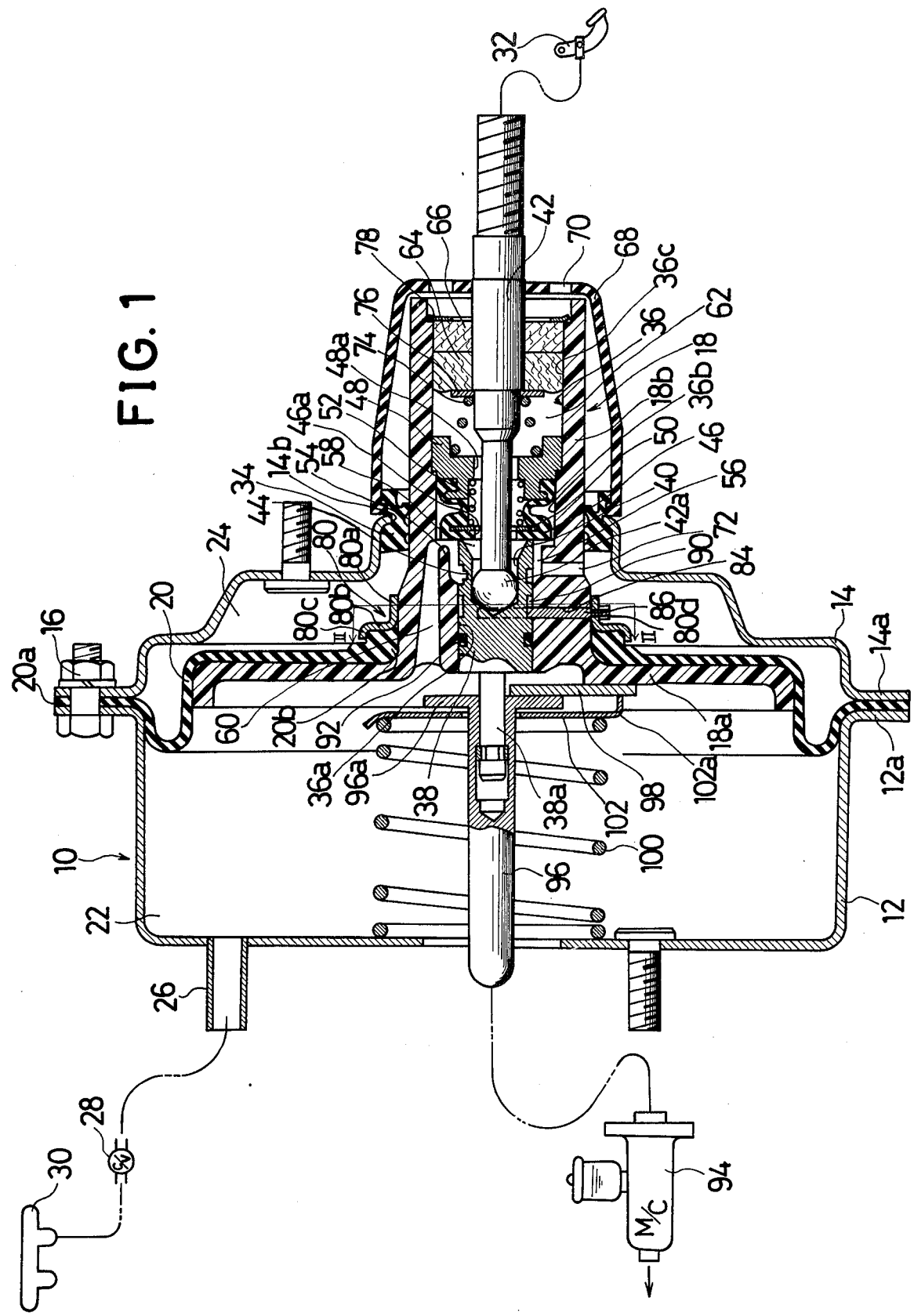

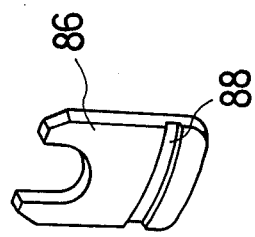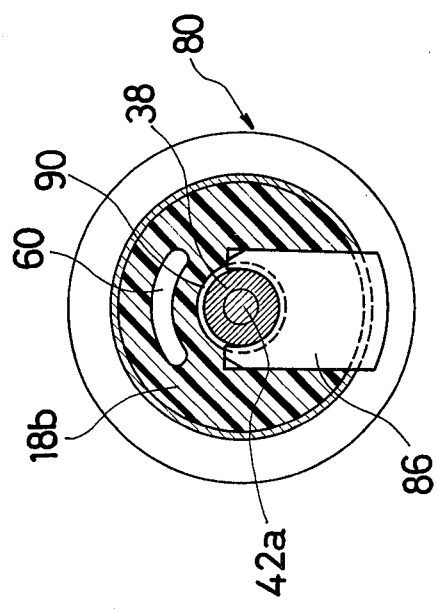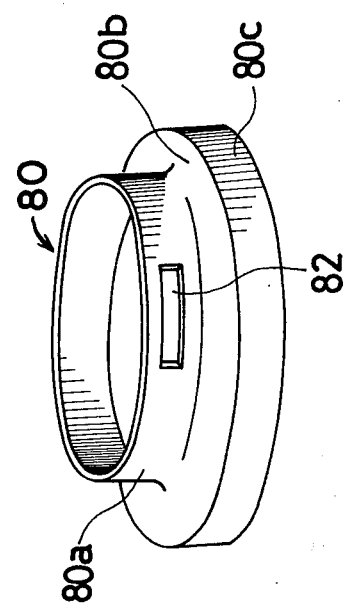

SERVOMOTOR

BACKGROUND OF THE INVENTION

This invention relates to improvements in a servomotor and more particularly to improvements for a fluid pressure servomotor used to operate the hydraulic brake systems of motor vehicles.

As well known in the art, conventional servomotors of the fluid pressure type have utilized a diaphragm secured to a power piston for forming pressure chambers in the housing of the servomotor. The power piston generally is made from a heat-resisting synthetic resin material. In order to secure the diaphragm, a retainer is placed on the power piston and turned so that the inner portion of the diaphragm is tightly sandwiched between the retainer and a disc-like portion of the power piston. The retainer is then maintained in position by hooking a plurality of projections formed on the inner periphery of the retainer on a plurality of projections formed on the outer periphery of a boss of the power piston.

However, in turning the conventional retainer to lock it into position, it is easy to rupture of initiate cracks on the inner portion of the diaphragm and thereby loose the seal between the diaphragm and power piston.

Furthermore, since projections must be provided on the power piston, a mold must be used for forming the power piston which is dividable into two portions along the axial line of the power piston. Because of difficulty in the cutting and processing work on the synthetic resin material from which the piston is formed, a deburring operation is also needed after formation of the power piston. These operations add significantly to the manufacturing cost.

Accordingly, it is a primary object of this invention to provide improvements in a servomotor that eliminate the aforementioned drawbacks in the conventional servomotor.

It is a further object of this invention to provide improvements in a servomotor for securing a diaphragm to a power piston uniformly and ensurely.

It is still another object of this invention to provide an improved servomotor that can be very economically manufactured while ensuring proper securing of the diaphragm to the power piston.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the improvements in the sevomotor of the invention comprise (1) a housing; (2) an annular diaphragm having its outer periphery sealingly attached to the housing; (3) power piston means axially movable within the housing and having (a) a boss axially extending through the annular diaphragm, the boss including a bore and an opening radially-extending from the bore to the outer periphery of the boss adjacent the diaphragm; and (b) an external flange extending radially from the outer periphery of the axially extending boss for positioning adjacent the diaphragm, and wherein said annular diaphragm and the power means form first and second pressure chambers in the housing; (4) valve means for regulating pressure in the first and second pressure chambers, the valve means including a valve member slidably and sealingly disposed in the bore and having an engaging groove in its outer periphery; (5) retaining means for coupling the diaphragm against the flange of the power means, the retaining means including (a) an axially extending cylindrical seat in which the boss is tightly positioned, and wherein the seat has a radial opening, and (b) an external flange radially extending from said seat for pressing an inner portion of the diaphragm against the flange of the power piston means when the retaining means is in a predetermined coupling position and wherein the radial opening of the seat coincides in a radial direction with the radially extending opening of the boss and the engaging groove of the valve member when the retaining means is in the predetermined coupling position; (6) pin means positioned in the openings of the retaining means and boss and the engaging groove of the valve member for locking the retaining means in the predetermined coupling position; and (7) means for maintaining the pin means in position.

The invention consists in the novel parts, constructions, arrangements, combinations and improvements shown and described. The accompanying drawings which are incorporated in and constitute a part of this specification, illustrate an embodiment of the invention and, together with the description, serve to explain the principles of the invention.

BRIEF DESCRIPTION OF THE DRAWINGS

FIG. 1 is a sectional view of a servomotor employing the improvements in accordance with the principles of this invention.

FIG. 2 is a sectional view taken along line II—II of FIG. 1.

FIG. 3 is a perspective view of the pin means of the servomotor shown in FIG. 1.

FIG. 4 is a perspective view of the retainer means of the servomotor shown in FIG. 1.

DETAILED DESCRIPTION OF THE DRAWINGS

Reference will now be made in detail to the present preferred embodiment of the invention, an example of which is illustrated in the accompanying drawings.

Referring now to FIG. 1, there is shown a servomotor of a fluid-pressure type for use in operating the hydraulic brake system in a motor vehicle.

In accordance with the invention, the servomotor has a housing 10. Preferably, the housing 10 is formed by a front shell 12 and a rear shell 14. A flange portion 14a formed at the front end of the rear shell 14 is joined to a flange portion 12a formed at the rear end of the front shell 12 by conventional means, such as a bolt 16.

In accordance with the invention, a power piston means 18 and an annular diaphragm 20 divide the interior of the housing 10 into a front pressure chamber 22 and a rear pressure chamber 24. The annular diaphragm 20 has an outer portion 20a sealingly secured to the housing 10. Preferably, the outer portion 20a is tightly sandwiched between the flange 12a of the front shell 12 and the flange 14a of the rear shell 14. It is also preferred that the power piston means 18 be made from a heat-resisting synthetic resin material and the diaphragm 20 from a flexible material such as rubber.

In the fluid-pressure servomotor shown in FIG. 1 for use in operating a vehicular brake system, the front pressure chamber 22 is connected to an intake-manifold 30 of an engine through a port 26 formed in the front shell 12 of housing 10, a conduit (not numbered), and a check valve 28 positioned in the conduit. The front chamber 22 is thereby provided with a pressure that is lower than atmospheric pressure in a normal operating condition of the servomotor.

In accordance with the invention, a valve means is provided for regulating the pressure in the front and rear pressure chambers 22 and 24. As herein embodied, the valve means is operated by a brake pedal 32 and arranged with the power piston means 18 for selectively connecting the rear pressure chamber 24 to either the front pressure chamber 22 or the atmosphere in response to the operation of the brake pedal 32.

In accordance with the invention, the power piston means 18 is axially movable within the housing 10 and has a boss portion 18b axially extending through the annular diaphragm 20 and a disc-like portion of flange 18a extending radially from the outer periphery of the boss portion 18b for positioning adjacent the diaphragm 20.

As herein embodied, the rear end of the boss portion 18b projects from an opening 14b of the rear shell 14 to the outer side of the rear shell 14. A seal member 34 is secured to the rim of the opening 14b in such a manner that the boss portion 18b of the power piston 18 is slidably and sealingly supported at its outer periphery by the inner periphery of the seal member 34. The seal member 34 therefore seals the rear pressure chamber 24 from the atmosphere by preventing pressure flow between the outer periphery of the boss portion 18b and the rim of the opening 14b of the rear shell 14.

In accordance with the invention, the power piston means 18 has a bore 36 axially extending completely through the boss portion 18b for slidably and sealingly accommodating a valve member of the valve means. Preferably, the valve member is an air valve 38 slidably disposed within a front portion 38a of the bore 36, the front portion 36a being smaller than central and rear portions 36b and 36c of the bore 36. A seal ring 92 is secured to the outer periphery of the air valve 38 for providing a seal between the inner surface of the bore 36 and the outer surface of the air valve 38. As herein embodied, the air valve 38 is formed with a bore 40 axially extending from the rear of the air valve 38.

It is preferred that the valve means further includes an axially displaceable valve-actuating member, such as rod 42, that is slidably positioned in the bore 36 of the power piston means 18. The rod 42 has a globular portion 42a on the frontward end which is pivotally secured within the bore 40 of the air valve 38 due to the caulking portion 44 of the air valve 38. The rearward end of the rod 42 projects from the boss portion 18b of the power piston means 18 and is operatively connected to the brake pedal 32.

As herein embodied, the valve means further includes a control valve 46 positioned within the central portion 36b of the bore 36 and held at its rearward end by a retainer 48. An inner portion of the frontward end surface of the control valve 46 contacts with or parts from the rearward end of the air valve 38 for respectively interrupting or establishing communication between an annular groove 56, defined by the outer periphery of a rearward end portion of the air valve 38, and an interior space 58 formed within the rearward end portion of the air valve 38. The annular groove 56 in turn communicates with the rear pressure chamber 24 through a passage 72 formed in the power piston means 18. An outer portion of the frontward end surface of the control valve 46 contacts with or parts from a seat 54, formed within the power piston 18, for respectively interrupting or establishing the communication between the annular groove 56 and a passage 60 formed within the power piston means 18. The passage 60 in turn communicates with the front pressure chamber 22.

Preferably, the interior space 58 communicates with an interior space 62 of the rearward end portion 36c of the bore 36 through a central hole 46a formed within the control valve 46 and a central hole 48a formed within the retainer 48. A cup-shaped rubber boot 68 is suitably affixed at its frontward end portion to an outer periphery of the seal member 34 for covering the rearward opening of the bore 36 to provide a suitable dirt seal. The boot 68 has a hole 70 in its rearward end portion and the rearward portion 36c of the bore 36 has air filters 64 and 66 located therein so that the interior space 62 communicates with the atmosphere through air filters 64 and 66, the rearward opening of the bore 36, and boot hole 70.

As herein embodied, a spring 74 is disposed within the interior space 62, the front end of which is held in position by the retainer 48 and the rear end of which is held in position by a retainer 76 on the rod 42, to maintain the retainer 48 in its position. A retainer 78 is further disposed within the rearward end of the bore 36 to maintain the air filters 64 and 66 in position.

Referring now to FIG. 1–4, in accordance with the invention, retaining means 80 is provided for coupling the diaphragm 20 against the flange 18b of the power piston means 18. An inner portion 20b of the diaphragm is sealingly secured to the power piston means 18 by being tightly sandwiched between the retainer means 80, which is inserted on the boss portion 18b of the power piston means 18, and the inner portion of the rearward end surface of the flange 18a of the power piston means 18.

According to the invention, the retainer means 80 comprises an axially extending cylindrical seat portion 80a, the inner periphery of which is tightly positioned over the outer periphery of the boss portion 18b of the power piston means 18, and an external flange portion 80b radially extending from the cylindrical seat portion 80a for tightly pressing the inner portion 20b of the diaphragm 20 to the inner portion of the rearward end surface of the flange 18b of the power piston means 18. As herein embodied, a cylindrical projection portion 80c extends axially from the outer edges of the flange portion 80b and presses against the diaphragm 20 for maintaining the inner portion 20b of the diaphragm in radial position.

In accordance with the invention, and as best seen in FIG. 4, the cylindrical seat portion 80a of retaining means 80 has a radial opening 82. As best seen in FIG. 1, the boss portion 18b of power piston means 18 is provided with a through opening 84 radially-extending from the frontward portion 36a of the bore 36 to the outer periphery of the bore 36 adjacent the inner portion of the diaphragm 20.

As best seen in FIGS. 1 and 2, the air valve 38 has an engaging annular groove 90 formed in its outer periphery. When the retaining means 80 is in a predetermined coupling position, i.e., the retaining means 80 is tightly pressing the inner portion 20b of the diaphragm 20 against the flange portion 18a of the power piston means 18, the openings 82 and 84 and engaging groove 90 coincide with each other in a radial direction.

According to the invention, a pin means 86, as best seen in FIG. 3, is provided for locking the retaining means 80 in coupling position. Referring now to FIGS. 1 and 2, the pin means 86 is positioned in the openings 82 and 84 of the retaining means 80 and the boss portion 18b of the power piston means 18 respectively and the engaging groove 90 of the air valve 38 when the retaining means 80 is in the predetermined coupling position. Means are further provided for maintaining the pin means 86 in position in the openings 82 and 84 and engaging groove 90. Preferably, the means for maintaining the pin means 86 in position is a groove 88 formed in the outer portion of the frontward surface of the pin means 86. A frontward rim portion 80d of the opening 82 of the retaining means 80 is received in the slot 88 and held in position in the groove 88 by the resilient force of the inner portion 20b of the diaphragm 20 acting against the retaining means 80. While the retaining means 80 is surely secured to the power piston means 18 it is done so only at one point in the circumferential direction. However, since the inner periphery of the cylindrical seat portion 80a of the retaining means 80 is in tight contact with the outer periphery of the boss portion 18b of the power piston means 18, the pressing force by the retaining means 80 on the inner portion 20b of the diaphragm 20 is substantially uniform at all points.

As herein embodied, the air valve 38 has limited displacement when the inner end of the pin means 86 is positioned in the groove 90.

The servomotor, as shown in FIG. 1, for use in a vehicular brake system has disposed within the front pressure chamber 22, a push rod 96 for depressing a piston (not shown) in a master cylinder 94, a plurality of reaction levers 98 for transferring force between the push rod 96 and the power piston means 18, and a return spring 100 for returning the power piston means 18 to its normal position.

Preferably, the push rod 96 has a bore 96a axially extending from the rearward end thereof. A rod portion 38a projecting axially outwardly from the frontward end of the air valve 38 is slidably positioned in the bore 96a. The frontward end of the push rod 96 projects from the frontward end of the housing 10 through a central opening of the front shell 12 and is operatively connected with the piston in the master cylinder 94. An inner portion of the reaction lever 98 is interposed between a disc-like portion 96a formed at the rearward end of the push rod 96 and the frontward end surface of the air valve 38. An outer portion of the reaction lever 98 is interposed between the frontward end surface of the flange 18a and an outer portion 102a of a spring retainer 102. Spring retainer 102 in turn is positioned on the push rod 96 adjacent the disc-like portion 96a. A rightward end of the return spring 100 is held in position by the retainer 102 and a leftward end of the spring 100 is held in position by the front shell 12. With the above arrangement, the reaction lever 98 transfer the power force from the power piston means 18 to the push rod 96 and applies a reaction force corresponding to the transferring force.

It can be seen from the foregoing that all the aforesaid elements of the servomotor remain in the positions shown in FIG. 1 when the servomotor is in its non-braking condition, i.e., no braking force is applied to the brake pedal 32. During this non-braking condition, the rear chamber 24 communicates with the front chamber 22. Accordingly, pressure in the rear chamber 24 is equal to the pressure in the front chamber 22.

When the operator of the vehicle applies a brake force to the brake pedal 32, the rod 42 will be moved in a leftwardly direction in FIG. 1. As the rod 42 moves in the leftwardly direction, the air valve 38 is also moved in the same direction. Due to the leftwardly biasing action of the spring 52 against the control valve 46, the control valve member 46 remains in engagement with the air valve 38 by moving leftwardly. This engagement between the valves 38 and 46 continues until the control valve 46 engages the seat 54. At this time, the communication between the front pressure chamber 22 and the rear pressure chamber 24 is interrupted. The communication between the rear pressure chamber 24 and the atmosphere is also interrupted at this time.

When the rod 42 continues to be urged leftwardly, the control valve 46 remains seated on the seat 54 and the air valve member 38 becomes disengaged from the control valve 46. When this occurs, the rear pressure chamber 24 establishes communication with the atmosphere through the openings 46a and 48a, the interior space 62, the air filters 64 and 64, and the hole 70 of the boot 68. This communication thereby increases the pressure in the rear pressure chamber 24 to atmospheric level. The difference in pressure in the pressure chambers 22 and 24 will cause the power piston means 18 to move leftwardly. In doing so, the push rod 96 is moved in the same leftwardly direction through the reaction level 98 to operate the master cylinder 94.

In this braking operation, when the force for moving the power piston means 18 in the leftward direction against the spring 100 is under a predetermined value, the inner portion of the reaction lever 98 is disengaged from the air valve 38. Therefore, no reaction force is transferred back to the brake pedal 32, because the outer portion of the reaction lever 98 is urged rightwardly by the action of the return spring 100. However, when the force exceeds the predetermined value, the inner portion of the reaction, lever 98 engages the air value 38 so that a reaction force is transferred to the rod 42 and thereby transmitted to the brake pedal 32 and to the operator's foot as brake "feel". The control valve 46 selectively engages either the seat 54 or the air valve 38 to control the pressure difference between the pressure chambers 22 and 24 in accordance with the power relationship between the reaction force and the brake force applied to the brake pedal 32. Therefore, the force which moves the power piston means 18 leftwardly is controlled in correspondence to the brake force applied to the brake pedal 32.

When the brake force applied to the brake pedal 32 is released, the brake pedal 32 is returned to its normal position by a brake pedal return spring (not shown). Therefore, the air valve 38 moves back in a rightward direction. This rightward movement causes the air valve 38 to again engage the control valve 46 so as to cut off the communication between the rear pressure chamber 24 and the atmosphere. Continued rightward movement causes the control valve 46 to disengage from the seat 54 and thus establish communication between the rear pressure chamber 24 and the front pressure chamber 22. Thus, the atmosphere pressure in the rear chamber 24 is sucked into the intake-manifold 30 through the front pressure chamber 22, thereby decreasing pressure in the rear pressure chamber 24 until pressure in the front and rear pressure chambers 22 and 24 is equal. Due to the equalized pressure and the action of the return spring 100, the power piston means 18 and the push rod 96 are moved rightwardly and the operation of the master cylinder 94 is released.

In the above described preferred embodiment of the servomotor employing the invention, the pressure difference between the front and rear pressure chambers is obtained by communicating the front pressure chamber 22 with a vacuum source and communicating the rear pressure chamber 24 with either the front chamber 22 or the atmosphere. However, it can be seen that this pressure difference could be obtained by communicating the front pressure chamber with the atmosphere and communicating the rear pressure chamber 24 with either a compressed air source or the atmosphere.

It can also be seen that the power piston means as described above could be formed from a mold having a first portion for forming the outer periphery and the rearward surface of the flange 18a and the outer periphery and the rearward surface of the boss portion 18b, a second portion for forming the frontward surface of the flange 18a and the passage 60, a third portion for forming the bore 36, a fourth portion for forming the passage 72, and a fifth portion for forming the radial opening 84.

It will be apparent to those skilled in the art that various modifications and variations could be made in the servomotor of the invention without departing from the scope or spirit of the invention.

What is claimed is:

1. In a servomotor, the improvement comprising:
   a. a housing;
   b. an annular diaphragm having its outer periphery sealingly attached to said housing;
   c. power piston means axially movable within said housing and having
      i. a boss axially extending through said annular diaphragm, said boss including a bore and an opening radially-extending from said bore to the outer periphery of said boss adjacent said diaphragm; and
      ii. an external flange extending radially from the outer periphery of said axially extending boss for positioning adjacent said diaphragm; and wherein said annular diaphragm and said power means form first and second pressure chambers in said housing;
   d. valve means for regulating pressure in said first and second pressure chambers, said valve means including a valve member slidably and sealingly disposed in said bore and having an engaging groove in its outer periphery;
   e. retaining means for coupling said diaphragm against said flange of said power piston means, said retaining means including
      i. an axially extending cylindrical seat in which said boss is tightly positioned, and wherein said seat has a radial opening;
      ii. an external flange radially extending from said seat for pressing an inner portion of said diaphragm against said flange of said power piston means when said retaining means is in a predetermined coupling position and wherein said radial opening of said seat coincides in a radial direction with said radially extending opening of said boss and said engaging groove of said valve member when said retaining means is in the predetermined coupling position;
   f. pin means positioned in said openings of said retaining means and boss and said engaging groove of said valve member for locking said retaining means in the predetermined coupling position; and
   g. means for maintaining said pin means in position.

2. The improvement in the servomotor of claim 1 wherein said maintaining means is a groove formed in the surface of said pin means and wherein said radial opening of said cylindrical seat has a rim receivable in said groove and held in position by the resilient force of said inner portion of said diaphragm acting against said retaining means.

3. The improvement in the servomotor of claim 2 wherein said retaining means further includes a projection extending axially from the outer edge of said flange of said retaining means against said diaphragm for maintaining said inner portion of said diaphragm in radial position.

4. The improvement in the servo-motor of claim 3 also including an annular shoulder on the surface of said diaphragm adjacent said retaining means and wherein said projection is cylindrical and interacts with said shoulder for maintaining said inner portion of said diaphragm uniformly in radial position.

5. The improvement in the servomotor of claim 1, wherein said valve means includes an axially displaceable valve-actuating member slidably positioned in said bore and wherein said pin means limits the axially displacement of said valve-actuating member with respect to said valve member.

* * * * *

UNITED STATES PATENT AND TRADEMARK OFFICE
CERTIFICATE OF CORRECTION

PATENT NO. : 4,043,251
DATED : August 23, 1977
INVENTOR(S) : Atushi Ohmi

It is certified that error appears in the above–identified patent and that said Letters Patent are hereby corrected as shown below:

Claim 1, column 7, line 44, after "power", insert --piston--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*